March 26, 1957  A. E. R. ARNOT  2,786,436
VEHICLE STEERING MECHANISM
Filed June 6, 1955  2 Sheets-Sheet 1
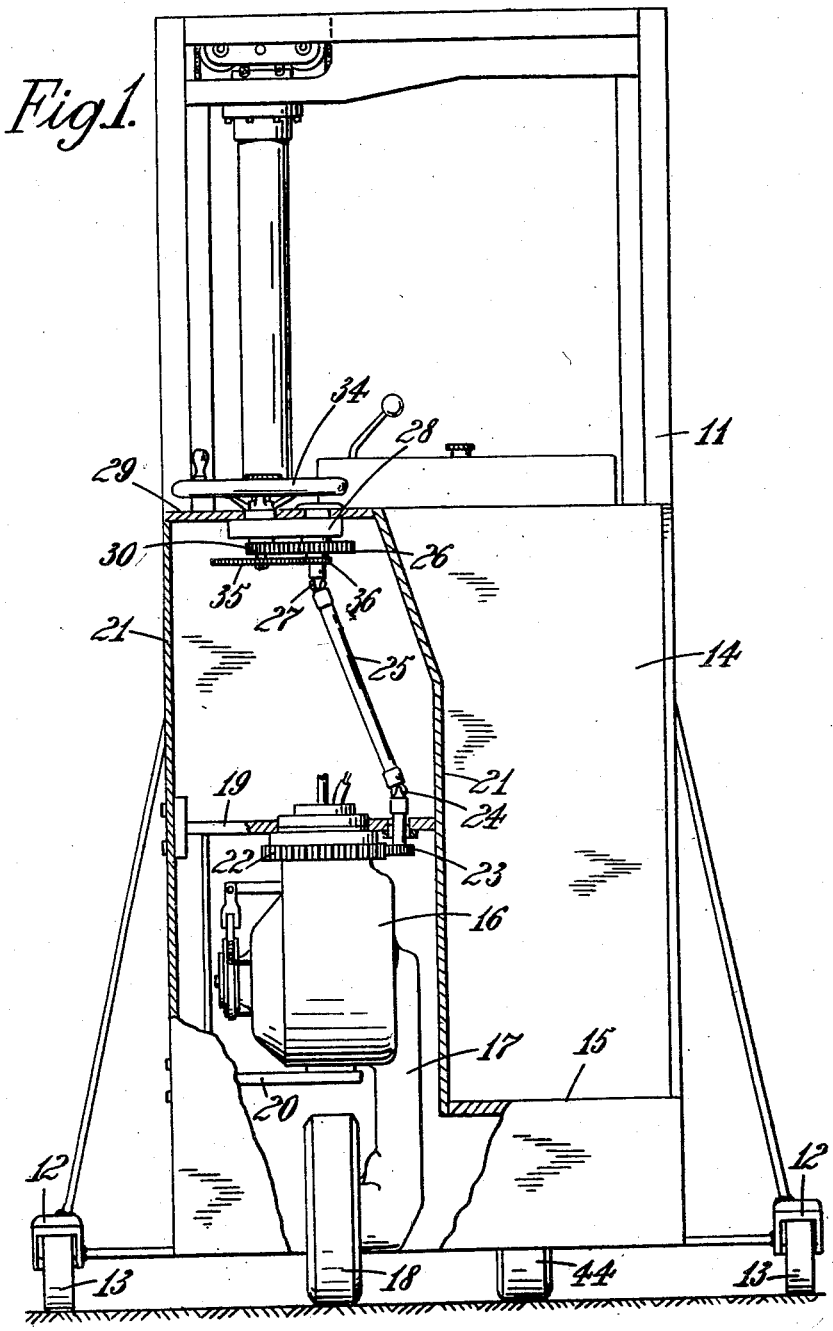
INVENTOR
ALFRED E. R. ARNOT
ATTORNEYS March 26, 1957  A. E. R. ARNOT  2,786,436
VEHICLE STEERING MECHANISM
Filed June 6, 1955  2 Sheets-Sheet 2
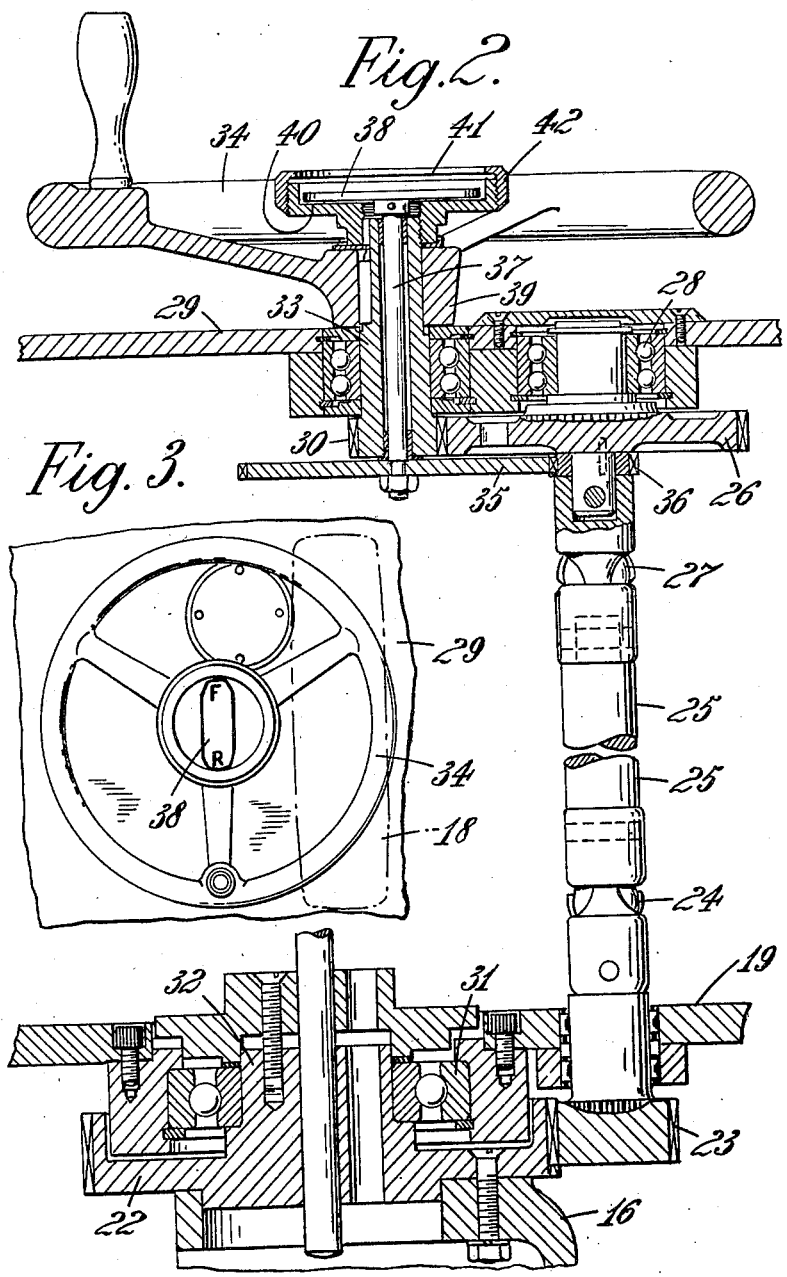
INVENTOR
ALFRED E R ARNOT
By Watson, Cole Grindle Watson
ATTORNEYS United States Patent Office 2,786,436
Patented Mar. 26, 1957

2,786,436

VEHICLE STEERING MECHANISM

Alfred Erwin Reginald Arnot, Basingstoke, England, assignor to Emmanuel Kaye and John Reginald Sharp, Basingstoke, England Application June 6, 1955, Serial No. 513,244

4 Claims. (Cl. 116—31)

The present invention comprises improvements in or relating to indexing mechanisms for vehicle steering wheels.

It is an object of the present invention to provide an improved device for indicating, to the vehicle operator, the position of the steerable wheel or wheels of the vehicle.

It is a further object of the invention to provide a steering indicator which is particularly suitable for use on goods handling trucks such as fork trucks, which trucks are used in factories and are provided with steering wheels having a wide angle of lock and are hidden beneath the vehicle. Sometimes such steering wheels are on a reversible turntable geared to a steering wheel and are power driven. It is of great importance, before an operator moves such a truck that he should know how the wheels are set.

According to the present invention, in a vehicle having a steerable wheel or wheels and a steering wheel operatively connected thereto so as to turn at a different angular velocity from the steerable wheel or wheels, a mechanism is provided for indicating the position of the vehicle steerable wheel or wheels characterised in that a rotatable indicator, operatively connected to the steerable wheel to move in unison therewith, is mounted at the centre of the vehicle steering wheel.

In a preferred construction the steering wheel and indicator are mounted for rotation about an upright or substantially upright axis positioned in or close to the steering axis of the wheel or wheels to be steered and the pointer is so geared to the steerable wheel or wheels as to keep parallel to the plane of the said wheel or wheels.

The pointer may be mounted on a vertical stem for rotation in a horizontal plane the said stem passing through the steering wheel hub and being mechanically connected to the steering mechanism of the vehicle.

The following is a description by way of example of one embodiment of the invention as applied to industrial trucks.

In the accompanying drawings:

Figure 1 is a rear elevation of a truck, parts being broken away to show the steering mechanism;

Figure 2 is a vertical section to a larger scale of part of the mechanism and

Figure 3 is a plan of the steering wheel and indicating pointer.

The truck shown in the drawings is similar in its main constructional features to that described in British patent specification No. 14,270/54, and comprises a mast 11 on which runs a fork carriage (not shown), the mast being connected to forwardly projecting horizontal straddle arms 12 (seen from the rear in Figure 1) which are supported by front ground wheels 13. Behind the mast (that is, on the side nearer the observer in Figure 1) is a driving and steering unit 14 which comprises a foot plate 15 on which the operator can stand and an electric motor 16 connected by a gear-box 17 to a driving steering ground-wheel 18. The electric motor, with its ground-wheel, is supported from the frame of unit 14 by brackets 19, 20, relatively to which it can turn about a steering axis located in the central plane of wheel 18.

The power driven steerable ground wheel 18 is therefore in effect mounted on a continuously rotatable and reversible turntable mounting formed by brackets 19, 20, and the bearings in which the motor 16 turns for steering. These parts are located in a casing 21 at the side of the foot plate 15. The motor 16 carries a gear wheel 22 mounted on a central stub axle 32 projecting upwardly from the wheel 22 and mounted in a ball race 31 carried in the bracket 19 (see Figure 2).

A gear wheel 23 of smaller diameter than the gear wheel 22 meshes with the wheel 22 and is connected through a universal joint 24 to an upwardly extending transmission shaft 25 within the casing 21, reaching almost to the top thereof, where it is connected to another gear wheel 26 through a second universal joint 27.

The gear wheel 26 at the top of the transmission shaft 25 is mounted for rotation in a ball race 28 connected to a top cover 29 on the casing 21 and meshes with a gear wheel 30 integral with a shaft 33 keyed to the steering wheel 34 of the vehicle.

A light gear wheel 35, below wheel 30, is meshed with a small gear wheel 36 on the upper end of the transmission shaft 25 which gear is positioned above the universal joint 27, and below the said gear wheel 26. The gear wheel 35 is on the end of a shaft 37 passing through the centre of the steering wheel shaft 33 and carries a pointer 38.

The steering wheel 34 rotates on a vertical axis nearly in line with but a little offset from the steering axis of the motor unit 16. The wheel 34 has a hollow hub 39 just above which, within and coaxial with the steering wheel is a circular unmarked dial 40 which lies in a horizontal plane and is provided with a transparent window plate 41 which fits into an upstanding circumferential flange on the dial and is held in place by a bezel 42. The dial 40 has a central vertical hole bored therein and is attached to the steering wheel hub by a key. The pointer 38 is mounted above the dial 40 and extends diametrically across it. The pointer 38 is marked at one end with the letter F to indicate the position of the front of the wheel and with the letter R at the other end to indicate the rear.

In operation, angular movement of the steering wheel 34 is transmitted through the top gears 30, 26, to the transmission shaft 25 and from that shaft through the gears 23, 22 at the bottom of the casing to the motor unit 16, with suitable reduction. Movement of the motor unit 16 and thus the ground wheel, is recorded by the pointer 38 through the gear 35 at the bottom of the pointer stem 37, and the small gear 36 on the transmission shaft 25. The ratio of the latter pair of gears is selected to compensate for the reduction between steering transmission and ground wheels.

As can be seen from Figure 3, the position of the indicator 38 is parallel with the ground wheel 18 and the F and R upon it shows to the operator whether the ground wheel 18 is positioned for direct forward movement or turning movement to the left or right. As a reminder of the function of the indicator 38 it is made of the same shape as the edge view of the ground wheel 18.

It will be seen that the provision of the indicator 38 in the centre of the steering wheel allows the truck operator to see the angular position of this power driven ground wheel with great convenience, and enables him to judge the exact direction of movement of the truck.

It is to be understood that the term "pointer" used herein is intended to cover, needle pointers, marked discs or any other such suitable element.

Below the platform 15 the rear part of the truck carries also a castor wheel 44 which helps to support the weight and which automatically aligns itself so as to be parallel with the power driven wheel 18.

I claim:

1. In a vehicle, steering mechanism comprising in combination a reversible turntable mounting, a wheel axle thereon, a vehicle wheel on said axle supporting the mounting, a steering wheel geared to the reversible mounting to rotate it, the gearing being of a ratio less than 1:1, a pointer in the center of said steering wheel and gearing connecting the pointer to the mounting to turn the pointer at the same angular speed as the mounting.

2. A vehicle having a mechanism as claimed in claim 1, wherein the steering wheel and pointer are mounted for rotation about a substantially upright axis positioned in or close to the steering axis of the vehicle wheel to be steered.

3. In a vehicle having a steerable ground wheel, supporting means mounting said ground wheel for continuous and reversible rotatable movement about a substantially vertical axis for steering said vehicle, a steering wheel for continuously rotating said ground wheel about said axis in either direction, gear means interconnecting said supporting means and said steering wheel to rotate said supporting means at an angular speed substantially less than that of said steering wheel, and ground wheel direction indicating means for indicating directly the direction and angular position of said ground wheel, said indicating means including gear means providing a 1:1 ratio with said ground wheel supporting means.

4. In a vehicle as claimed in claim 3, wherein said indicating means includes a pointer means mounted in the hub of said steering wheel for continuous rotation in either direction.

References Cited in the file of this patent

UNITED STATES PATENTS

| | | |
|---|---|---|
| 2,147,598 | Becker | Feb. 14, 1939 |
| 2,169,861 | Walsh | Aug. 14, 1939 |
| 2,282,189 | Jackson | May 5, 1942 |